(12) United States Patent
Kim

(10) Patent No.: US 7,221,408 B2
(45) Date of Patent: May 22, 2007

(54) ADAPTIVE CONTRAST ENHANCEMENT METHOD FOR VIDEO SIGNALS BASED ON TIME-VARYING NONLINEAR TRANSFORMS

(75) Inventor: Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 693 days.

(21) Appl. No.: 10/641,970

(22) Filed: Aug. 15, 2003

(65) Prior Publication Data

US 2005/0036071 A1 Feb. 17, 2005

(51) Int. Cl.
*H04N 5/52* (2006.01)

(52) U.S. Cl. .............. 348/671; 348/678; 348/625; 382/274

(58) Field of Classification Search ............. 348/678, 348/671–673, 679, 683, 625; 382/274; 345/690; 358/461; *H04N 5/52*
See application file for complete search history.

(56) References Cited

U.S. PATENT DOCUMENTS

| 5,862,254 A | 1/1999 | Kim |
| 5,923,383 A | 7/1999 | Kim |
| 5,963,665 A | 10/1999 | Kim |
| 7,042,522 B2 * | 5/2006 | Kim .................. 348/671 |
| 2003/0025838 A1 | 2/2003 | Kim |

OTHER PUBLICATIONS

U.S. Appl. No. 10/892,775, filed Jul. 16, 2004, Kim.
W.K. Pratt, *Digital Image Processing*, Wiley Interscience, 1991, pp. 263-284, 2nd ed., New York.
A.K. Jain, *Fundamentals of Digital Image Processing*, Prentice Hall, 1989, pp. 235, 241-244, Englewood Cliffs.

* cited by examiner

*Primary Examiner*—Trang U. Tran
(74) *Attorney, Agent, or Firm*—Kenneth L. Sherman, Esq.; Michael Zarrabian, Esq.; Myers Dawes Andras & Sherman, LLP

(57) ABSTRACT

An adaptive contrast enhancement (ACE) method and apparatus provide a natural enhancement in accordance with the time-varying characteristics of a video sequence. Characteristics of a time varying video sequence are specified and a nonlinear transform over the input video sequence is performed to enhance mainly the contrast of the input. A probability density function (PDF) of a time varying input video sequence is computed and then some predetermined video parameters relating to contrast is extracted from the PDF. Based upon the extracted video parameters, a nonlinear transform function is then constructed and updated as a look up table (LUT), which is synchronized with the associated video picture or field SYNC signal. The transform LUT is then applied to the input video to provide an enhanced video output signal.

34 Claims, 7 Drawing Sheets

ADAPTIVE CONTRAST ENHANCEMENT METHOD FOR VIDEO SIGNALS BASED ON TIME-VARYING NONLINEAR TRANSFORMS

FIELD OF THE INVENTION

The present invention relates generally to video processing, and more particularly to video signal enhancement.

BACKGROUND OF THE INVENTION

The development of modern digital video technology has brought significant enhancement in the video quality for consumers, such as in DVD players and in digital TVs (DTV) compared to the analog TV systems. However, such digital video systems only enhance the video quality in terms of signal to noise ratio (SNR) and resolution, without regard to other important issues relating to video enhancement. Such issues include contrast enhancement, brightness enhancement, and detail enhancement. Generally, video enhancement processes comprise a collection of techniques that seek to improve the visual appearance of video when displayed. This primarily includes gray level and contrast manipulation, noise reduction, edge crispening and sharpening. Compared to image restoration, video or image enhancement methods neither increase the inherent information content in the data nor require mathematical modeling. The basic principle of video enhancement is to manipulate a given sequence of images so that their appearance on display media can be improved. Because quantifying the criteria for enhancement is difficult, conventional video enhancement techniques are empirical and require interactive procedures to obtain satisfactory results.

Among the techniques for video enhancement, contrast enhancement is important because it plays a fundamental role in the overall appearance of an image to human being. A human being's perception is sensitive to contrast rather than the absolute values themselves. Hence, it is natural to enhance the contrast of an image in order to provide a good looking image to human beings.

Contrast enhancement involves considering the overall appearance of a given image rather than local appearances such as edge crispening or peaking. There are conventional models of contrast enhancement, and some examples include the root law and the logarithmic law. Image enhancement by contrast manipulation has been performed in various fields of medical image processing, astronomical image processing, satellite image processing, infrared image processing, etc. For example, histogram equalization is a useful method in X-ray image processing because it enhances the details of an X-ray image significantly to e.g. detect tumors easily.

Although several conventional methods for contrast enhancement exist, their primary application is limited to still images. Direct applications of such methods to moving images results in visual artifacts such as unnatural appearance or over-enhancement. Hence, such methods are not suitable for consumer products such as TV whose primary content is a sequence of images. Therefore, there is a need for a contrast enhancement method that is applicable to a video sequence which inherently has time-varying characteristics.

BRIEF SUMMARY OF THE INVENTION

The present invention addresses the above needs. It is an object of the present invention to provide an adaptive contrast enhancement (ACE) method and apparatus which provide a natural enhancement in accordance with the time-varying characteristics of a video sequence.

In one embodiment, an ACE method according to the present invention includes the steps of specifying the characteristics of a time varying video sequence and performing a nonlinear transform over the input video sequence to enhance mainly the contrast of the input. As such, first, a probability density function (PDF) of a time varying input video sequence is computed and then some predetermined video parameters relating to contrast is extracted from the PDF. Based upon the extracted video parameters, a nonlinear transform function is then constructed and updated as a look up table (LUT), which is synchronized with the associated video picture or field SYNC signal. The transform LUT is then applied to the input video to provide an enhanced video output signal.

An example method for adaptive contrast enhancement, according to the present invention includes the steps of: (i) obtaining a time varying video signal including a plurality of temporally ordered digital pictures, each one of the digital pictures represented by a set of samples, each one of the samples having a gradation level in a range from a lower limit C to an upper limit U; (ii) constructing a contrast enhancement transform including at least a first transform function and a second transform function by: for a first one of the digital pictures, selecting a first value for the samples with gradation values between the lower limit C and the upper limit U; dividing the set of the samples representing the first one of the digital pictures into a first portion having samples with a first mean value not greater than the first value and a second portion having samples with a second mean value not less than the first value; selecting the first transform function based on a distribution of the samples with the first mean value in the first portion, wherein the first transform function is based on a first enhancement function that is a varying function of gradation level, equaling zero at the lower limit C, equaling zero at the first value, and having only one local maxima in a range from the lower limit C to the first value; and selecting the second transform function in dependence on a distribution of the samples with the second mean value in the second portion, wherein the second transform function is based on a second enhancement function that is a varying function of gradation level, equaling zero at the first value, equaling zero at the upper limit U, and having only one local maxima in a range from the first value to the upper limit U; and (iii) enhancing contrast of a digital picture by applying the contrast enhancement transform to a set of samples representing the digital picture.

In another embodiment, the present invention provides an adaptive contrast enhancement device for enhancing a time varying video signal including a plurality of temporally ordered digital pictures, each one of the digital pictures represented by a set of samples, each one of the samples having a gradation level in a range from a lower limit C to an upper limit U. The adaptive contrast enhancement device comprises: (i) a distribution estimator that determines the number of samples in a picture, having gradation values; (ii) a mean estimator that: for a first one of the digital pictures, determines a first value for the samples with gradation values between the lower limit C and the upper limit U; for a first portion of the samples, determines a first mean value not greater than the first value, and for a second portion of the samples, determines a second mean value not less than the first value; and (ii) a contrast enhancer that enhances contrast of the digital picture by applying a contrast enhancement transform to a set of samples representing the digital picture, the contrast enhancer including a first transform function and a second transform function, wherein: the first transform function is based on a distribution of the samples with the first mean value in the first portion, and the second transform function in dependence on a distribution of the samples with the second mean value in the second portion.

As such, the present invention provides a contrast enhancement method and device that are applicable to a video sequence which inherently has time-varying characteristics.

BRIEF DESCRIPTION OF THE DRAWINGS

These and other features, aspects and advantages of the present invention will become understood with reference to the following description, appended claims and accompanying figures where:

Like reference characters refer to like elements.

DETAILED DESCRIPTION OF THE INVENTION

Figure 1A:
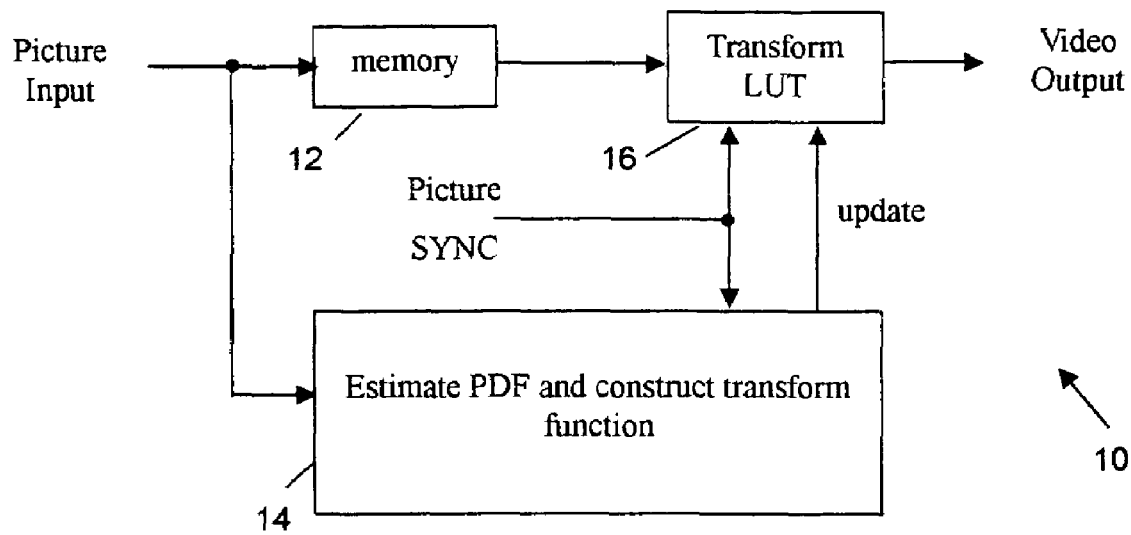
FIG. 1A is a block diagram of an embodiment of a device for performing the adaptive contrast enhancement method according to the present invention.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

As noted above, an Adaptive Contrast Enhancement (ACE) method according to the present invention specifies the characteristics of a time varying video sequence and performs a nonlinear transform over the input video sequence to enhance mainly the contrast of the input. Referring to FIG. 1A, an example architecture of an ACE apparatus (device) 10 implementing an example ACE method according to the present invention, is shown. In a functional block 14, a probability density function (PDF) of a time varying input video sequence is computed and then some predetermined video parameters relating to contrast is extracted from the PDF. Based upon the extracted video parameters, a nonlinear transform function is then constructed and updated as a look up table (LUT) in the block 14, which is synchronized with the associated video picture or field SYNC signal. The transform LUT is then applied to the input video to enhance the input signal in a functional block 16. Therefore, the primary steps of the ACE method are the extraction of the video parameters relating to the contrast of the input video signal and the construction of the transform function, described further below.

In the example of FIG. 1A, a memory device 12 is used to delay the input video for one frame/field period to apply the constructed transform to the video frame/field used for the transform construction. The incoming picture is stored in the memory 10 while the transform LUT is constructed using parameters obtained from the picture. The memory 10 is provided to delay the input video for one frame or field period so that the transform LUT can be applied to the picture that was used to construct the transform LUT, as shown in the functional block 14. Alternatively, as shown in another example ACE apparatus 20 of FIG. 1B, the memory device can be removed from the architecture because a video sequence typically has a high correlation in temporal direction, and therefore, in most applications, the LUT transform that is constructed from one picture can be applied to the subsequent picture in the video sequence.

The example ACE method according to the present invention is now described in more detail. In this description, $I_n(\cdot)$ denotes a picture (fame, or, field) of an incoming video sequence at time instant n, wherein the picture $I_n(\cdot)$ comprises samples to be enhanced whose values are, in general, from the gradation levels $\{C, C+1, \ldots, U\}$, where C is associated with the black gradation level and U is associated with the white gradation level in a video system. The determination of the values of C and U is based on each particular application (e.g., C=0, U=255, etc.). The range represented by $\{C, C+1, \ldots, U\}$ can be narrower than the real dynamic range of the input picture system.

The average brightness, or, the mean of the input video picture $I_n(\cdot)$ is denoted as m, and h(x) denotes the PDF of $I_n(\cdot)$, where h(x) represents the number of the samples in $I_n(\cdot)$ whose gradation level equals to x. It is preferable to use the mean m, since good results are obtained with this parameter, however, it should be understood that another value deviating from the mean m could be used instead. Conceptually any one of a number of values between C and U could be used, however, it is preferable to use the mean or a value very close to the mean so that the average brightness will not be changed, or at least will not be changed significantly.

A value $$N = \sum_{x=C}^{U} h(x)$$

represents the total number of samples in the input video picture $I_n(\cdot)$ to be enhanced. Then the mean of those samples can be computed as $$m = \sum_{x=C}^{U} x \cdot h(x)/N.$$

Or, simply the mean can be computed by summing up the gradation levels of the samples in the input video picture to be enhanced and dividing by N.

Based on the mean, m, two parameters $m_l$ and $m_u$ are computed which are associated with the mean of samples lower than or equal to the mean m and the mean of samples greater than or equal to the mean m, respectively, wherein:

$$m_l = \frac{\sum_{x=C}^{m} h(x)x}{\sum_{x=C}^{m} x} \quad (1)$$

and $$m_u = \frac{\sum_{x=m}^{U} h(x)x}{\sum_{x=m}^{U} x} \quad (2)$$

such that $C \leq m_l \leq m$ and $m \leq m_u \leq U$. The parameters $m_l$ and $m_u$ roughly indicate how the corresponding samples are distributed in the regions (C,m) and (m,U), respectively. In one example, the values $m_u$ and $m_l$ represent the mean brightness of the sub-images (the first is the sub-image which can virtually comprise of the samples less than or equal to the mean, and the second is the sub-image which can virtually comprise of the samples greater than or equal to the mean, respectively). For example, $m_l \approx m$ implies that the samples in the region (C,m) are mostly distributed near to the mean m, whereas $m_l \approx C$ implies that the samples in the region (C,m) are mostly distributed near to C. Similarly, $m_u \approx m$ implies that the samples in the region (m,U) are mostly distributed near to the mean m, whereas $m_u \approx U$ implies that the samples in the region (m,U) are mostly distributed near to U. The value of m can be selected as desired depending on application (e.g., m=128).

Figure 2:
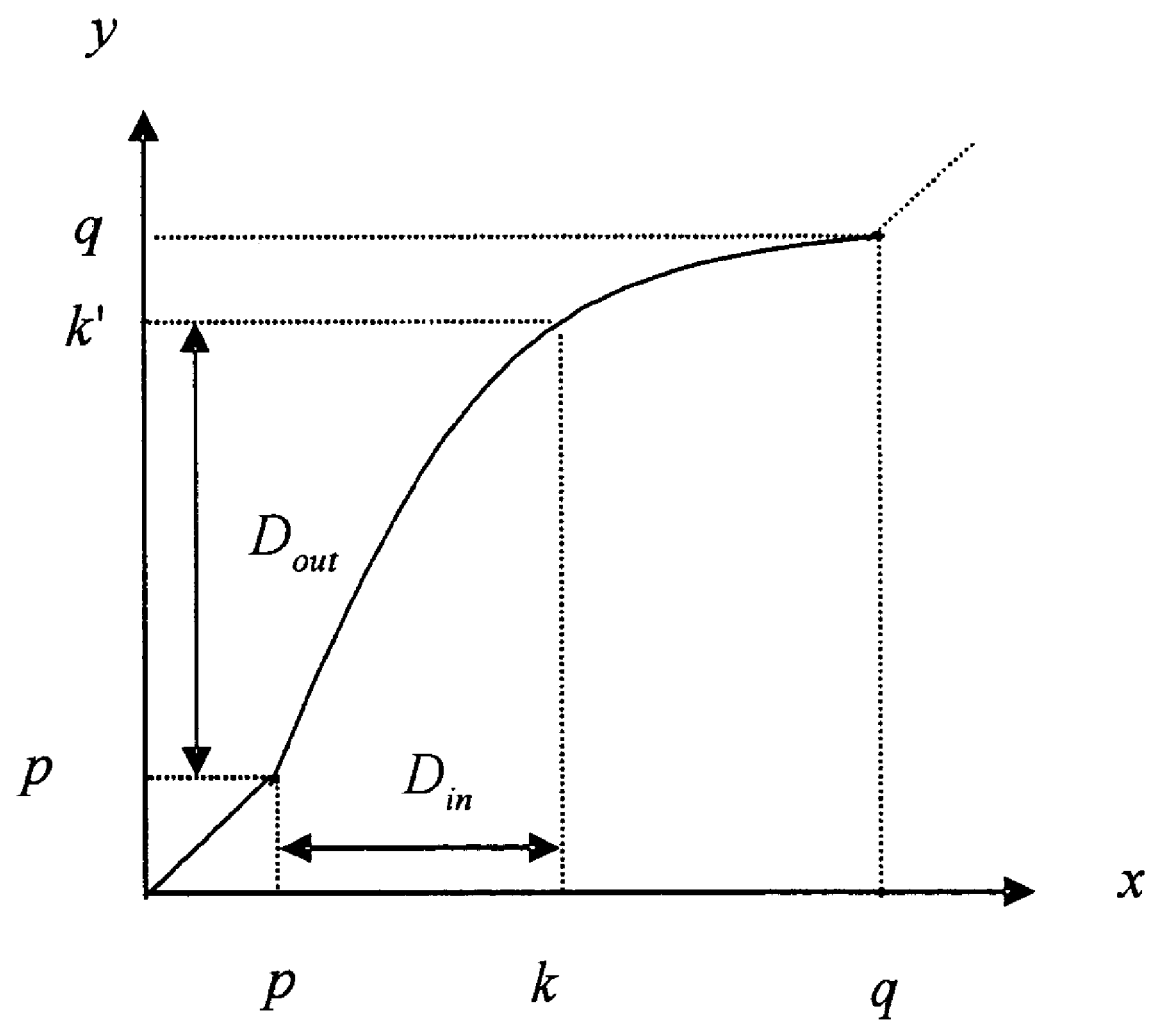
FIG. 2 shows an example of a transform that can be used to increase the dynamic range of samples having gradation levels within a certain range.

FIG. 2 shows an example representation of a transform, wherein x denotes the input gradation level of the input sample and y denotes the transformed output. In this example, the gradation values in the region (p,k) are mapped to the values in the region (p,k'). Hence, the dynamic range, $D_{in}$, for the samples whose gradation levels are in the region (p,k) is increased to $D_{out}$ as a result of the transform. The overall contrast of the image is enhanced if the input picture has more samples in the region (p,k) than in the region (k,q) because the dynamic range for the samples in the region (p,k) has been increased.

Therefore, the example transform illustrated in FIG. 2 is suitable to enhance the contrast when the samples are distributed more in the region (p,k) than in the region (k,q). However, if more samples are distributed in the region (k,q) than in the region (p,k), then another example transform function shown in FIG. 3 can increase the overall contrast of the picture.

Figure 3:
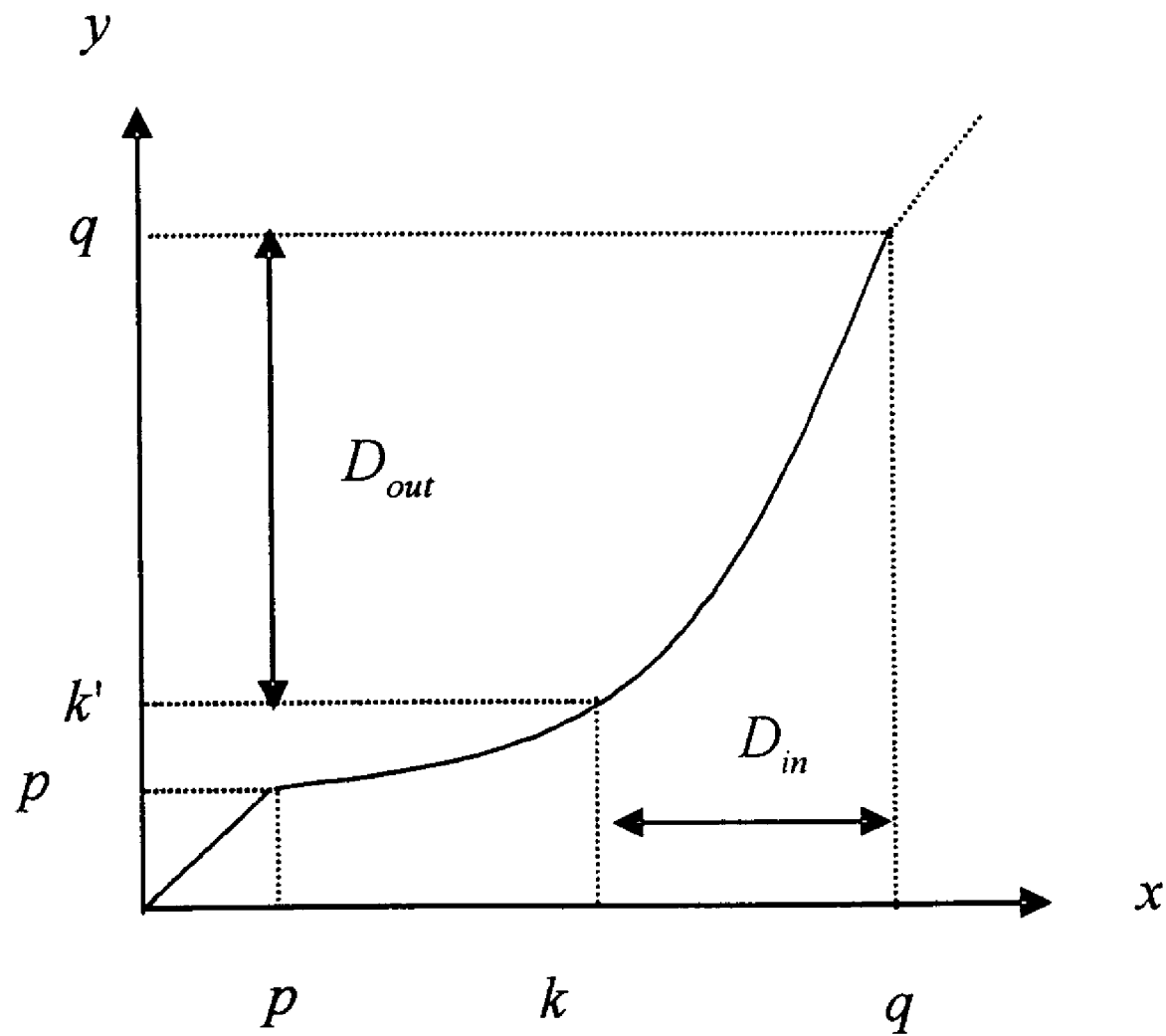
FIG. 3 shows an example of a transform that can be used to increase the dynamic range of samples having gradation levels within another range.

Further, ACE can be performed according to the present invention by combining the example transforms of FIGS. 2–3 in accordance with the sample distribution of the input image. The transform function is adjusted adaptively in accordance with the distribution of the gradation levels in the input picture in order to increase the overall contrast of the picture. An example transform $\psi(x)$ for the ACE according to the present invention is represented by:

$$\psi(x) = \begin{cases} x + g_l(m_l) \cdot f_l(x), & C \leq x \leq m \\ x + g_u(m_u) \cdot f_u(x), & m \leq x \leq U \\ x, & \text{otherwise} \end{cases} \quad (3)$$

wherein $f_l(x)$ and $f_u(x)$ are enhancement basis functions, and $g_l(m_l)$ and $g_u(m_u)$ are adaptive gain adjusting functions. The enhancement basis functions $f_l(x)$ and $f_u(x)$ determine the general characteristics of the enhancement, whereas the adaptive gain adjusting functions $g_l(m_l)$ and $g_u(m_u)$ control the manner and degree of enhancement associated with the input picture.

The following constraints apply to the enhancement basis functions:

$f_l(x)$ is positive and only defined in region (C,m) and $f_u(x)$ is positive and only defined in region (m,U), $$f_l(C) = f_l(m) = 0, \text{ and } f_u(m) = f_u(U) = 0, \quad (5)$$

$f_l(x)$ has a local maxima in (C,m) and $f_u(x)$ has a local maxima in (m,U), (6)

Figure 4A:
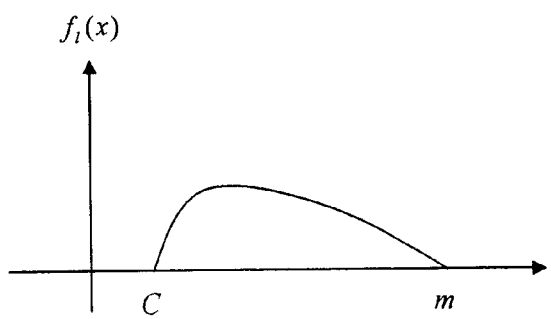
FIGS. 4A–C show examples of enhancement functions.
Figure 4B:
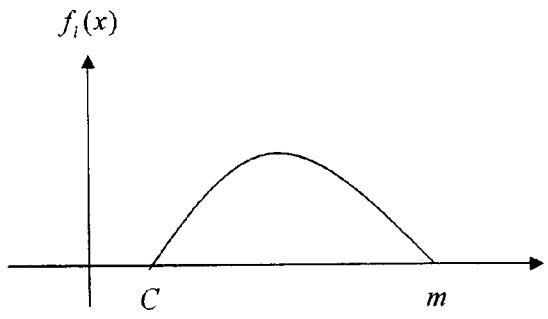
Figure 4C:
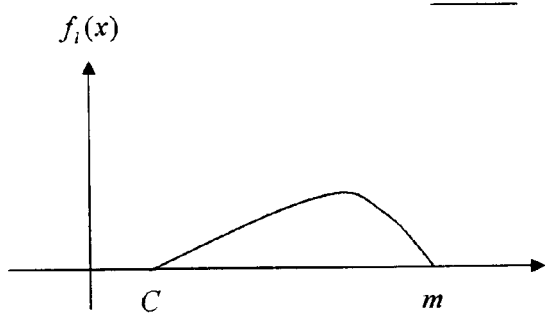

Arbitrary enhancement basis functions can be used so long as they meet the constraints given in relations (4)–(6) above. For example, FIGS. 4A–C show three example plots of the lower enhancement basis function, $f_l(x)$, satisfying the constraints given in relations (4), (5) and (6) above.

The followings are constraints apply to the adaptive gain adjusting functions:

$$g_l(C) = 1, \text{ and } g_l(m) = -1, \quad (7)$$

$$g_u(m) = 1, \text{ and } g_u(U) = -1, \quad (8)$$

$g_l(m_l)$ is a monotonically decreasing function with respect to $m_l$, (9)

$g_u(m_u)$ is a monotonically decreasing function with respect to $m_u$, (10)

wherein the value of $g_l(m_l)$ changes from 1 to $-1$ as $m_l$ varies from C to m and the value of $g_u(m_u)$ changes from 1 to $-1$ as $m_u$ varies from m to U. The gain parameters adjust the enhancement functions in accordance with the sample distribution as discussed in relation to FIGS. 2–3 above. Further, the negative sign of $g_l(m_l)$ and $g_u(m_u)$ revert the curvature direction of the enhancement basis functions $f_l(x)$ and $f_u(x)$.

If the enhancement basis functions $f_l(x)$ and $f_u(x)$ are negative in the regions (C,m) and (m,U), respectively, the conditions given in relations (7)–(10) are changed, respectively, to:

$$g_l(C) = -1, \text{ and } g_l(m) = 1, \quad (11)$$

$$g_u(m) = -1, \text{ and } g_u(U) = 1, \quad (12)$$

$g_l(m_l)$ is a monotonically increasing function with respect to $m_l$, (13)

$g_u(m_u)$ is a monotonically increasing function with respect to $m_u$. (14)

Referring back to relation (3) above, the input gradation levels in (C,U) are changed as $g_l(m_l) \cdot f_l(x)$ if $x \in (C,m)$ and as $g_u(m_u) \cdot f_u(x)$ if $x \in (m,U)$. The transform given in relation (9)

maps m to m because it is required that $f_l(m)=f_u(m)=0$, keeping the mean brightness of the transformed picture without significant change compared to the mean brightness of the input picture.

The characteristics of the transform in relation (3) change from picture to picture as the characteristics or the gradation level distribution of the video signal changes from picture to picture. Specifically, the values of the parameters m, $m_l$ and $m_u$ vary from picture to picture, and so does the final transform ψ(x) in relation (3). This provides the adaptive nature of an example contrast enhancement method according to the present invention.

Figure 5A:
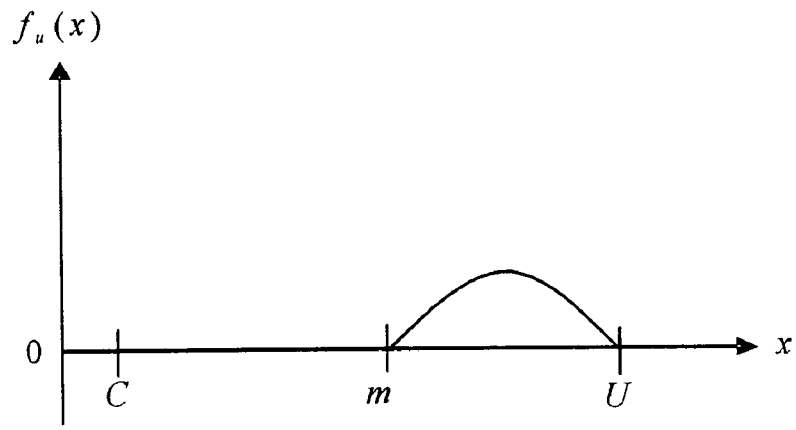
FIG. 5A shows an example of the enhancement functions $f_l(x)$ and $f_u(x)$.
Figure 5B:
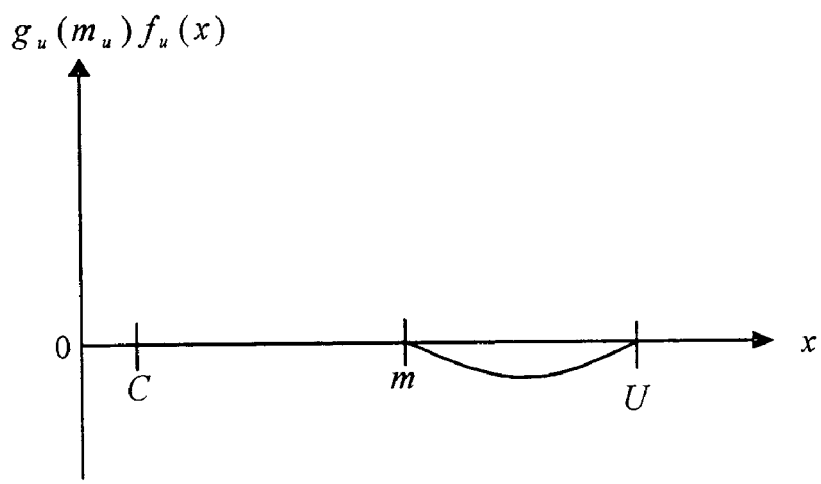
FIG. 5B shows a plot of $f_l(x) \cdot g_l(m_l)$ and $f_u(x) \cdot g_u(m_u)$.
Figure 5C:
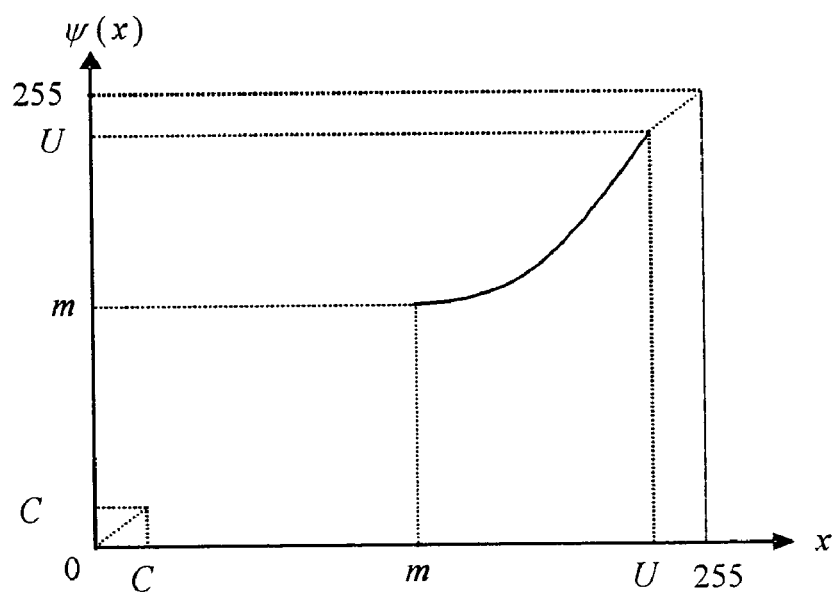
FIG. 5C shows a plot of then transform function that is obtained using the terms $f_l(x) \cdot g_l(m_l)$ and $f_u(x) \cdot g_u(m_u)$.

Referring to FIG. 5A an example of the enhancement function $f_u(x)$ which satisfies the conditions given in relations (4)–(6), is illustrated. Further, FIG. 5B shows an example plot of the term $f_u(x) \cdot g_u(m_u)$ of relation (3), wherein e.g. $g_u(m_u)=-0.25$. And, FIG. 5C is an example of a complete plot of the transform ψ(x), for m≤x≤u, in relation (3) to be applied to the input video.

Figure 6:
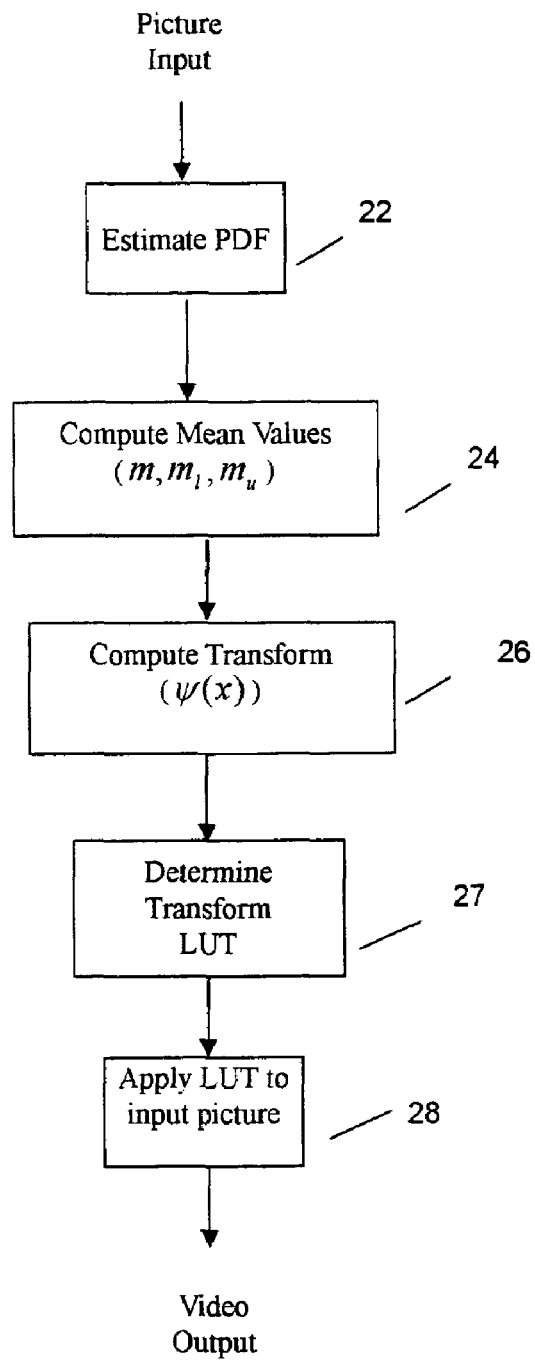
FIG. 6 shows an example flowchart of an embodiment of a adaptive contrast enhancement method according to the present invention.

Referring to FIG. 6 an example flowchart of the steps of the above embodiment of the contrast enhancement method of the present invention is shown. Specific functional forms of $f_l(x)$, $f_u(x)$, $g_l(m_l)$ and $g_u(m_u)$ that satisfy the respective conditions in relation (4) through (10) predetermined. Generally, the contrast enhancement method based on the transform given in relation (3) further includes the steps of:

Computing the PDF, h(x), of the incoming picture $I_n(\cdot)$ (step 22);

Computing the mean, m, and the values $m_l$ and $m_u$ (step 24);

Computing the gain functions $g_l(m_l)$ and $g_u(m_u)$ (step 26);

Using the transform in relation (3) to construct the transform LUT (step 27); and Applying the LUT to the incoming video input signal to generate an enhanced video signal (step 28).

As noted above, the LUT update can be synchronized with a picture SYNC signal, wherein the LUT is applied to transform the input picture that was used to construct the transform and stored in a picture memory (e.g., FIG. 1A). Or, the LUT can be applied to the next input picture if no memory is incorporated (e.g., FIG. 1B). This process is a pixel by pixel operation which outputs ψ(x) for the input pixel gradation level x.

In the above, the example ACE method is based upon the enhancement functions combined with the adaptive gain adjustment, depending on the sample distribution of the incoming picture. Any arbitrary function for $f_l(x)$, $f_u(x)$, $g_l(m_l)$ and $g_u(m_u)$ can be used as long as they are subject to the conditions given in relations (4)–(10) above.

In another example ACE method according to the present invention, a second order polynomial is used as one specific embodiment of the enhancement functions used in relation (3), wherein:

$$f_l(x)=K_l(x-C)(m-x), \quad (15)$$

$$f_u(x)=K_u(m-x)(x-U), \quad (16)$$

where $K_l$ and $K_u$ are pre-determined constants. These enhancement functions satisfy the constraints in relations (4)–(6). Accordingly, the transform in relation (3) an be represented as:

$$\psi(x) = \begin{cases} x + g_l(m_l) \cdot K_l(x-C)(m-x), & C \leq x \leq m \\ x + g_u(m_u) \cdot K_u(m-x)(x-U), & m \leq x \leq U \\ x, & \text{otherwise} \end{cases} \quad (17)$$

The choices of the gain functions, $g_l(m_l)$ and $g_u(m_u)$, are versatile, satisfying the constraints given in relations (11)–(14). Different gain functions result in different characteristics of ψ(x) and, hence, said gain function choices can be varied depending on specific application. A simple example choice of $g_l(m_l)$ and $g_u(m_u)$ can be:

$$g_l(m_l)=2(m_l-C)/(m-C)-1 \text{ and } g_u(m_u)=2(m_u-m)/(U-m)-1. \quad (18)$$

Direct applications (using constants for $K_l$ and $K_u$) of the transform given in relation (17) may result in the gray inversion problem, depending on the value of m where the gray inversion implies, wherein ψ($x_1$)>ψ($x_2$) for some $x_1<x_2$.

Such gray inversion problem can be prevented with an algebraic manipulation such as:

$$\psi(x_1) < \psi(x_2) \overset{\text{iff}}{\Leftrightarrow} x_1 < x_2$$

wherein the above values $K_l$ and $K_u$ are bounded such as:

$$K_l \leq \frac{1}{m-C} \text{ and } K_u \leq \frac{1}{U-m}.$$

As such, for the boundary values of $K_l$ and $K_u$, the transform given in relation (17) becomes:

$$\psi(x) = \begin{cases} x + g_l(m_l) \cdot \frac{(x-C)(m-x)}{m-C}, & C \leq x \leq m \\ x + g_u(m_u) \cdot \frac{(m-x)(x-U)}{U-m}, & m \leq x \leq U \\ x, & \text{otherwise} \end{cases} \quad (19)$$

Furthermore, depending on applications, the transform can be represented by:

$$\psi(x) = \begin{cases} x + \alpha \cdot g_l(m_l) \cdot \frac{(x-C)(m-x)}{m-C}, & C \leq x \leq m \\ x + \alpha \cdot g_u(m_u) \cdot \frac{(m-x)(x-U)}{U-m}, & m \leq x \leq U \\ x, & \text{otherwise} \end{cases} \quad (20)$$

where α is a pre-determined gain to adjust the overall degree of enhancement. Note that ψ(x)=x when α=0 in relation (20), meaning no change.

Figure 7:
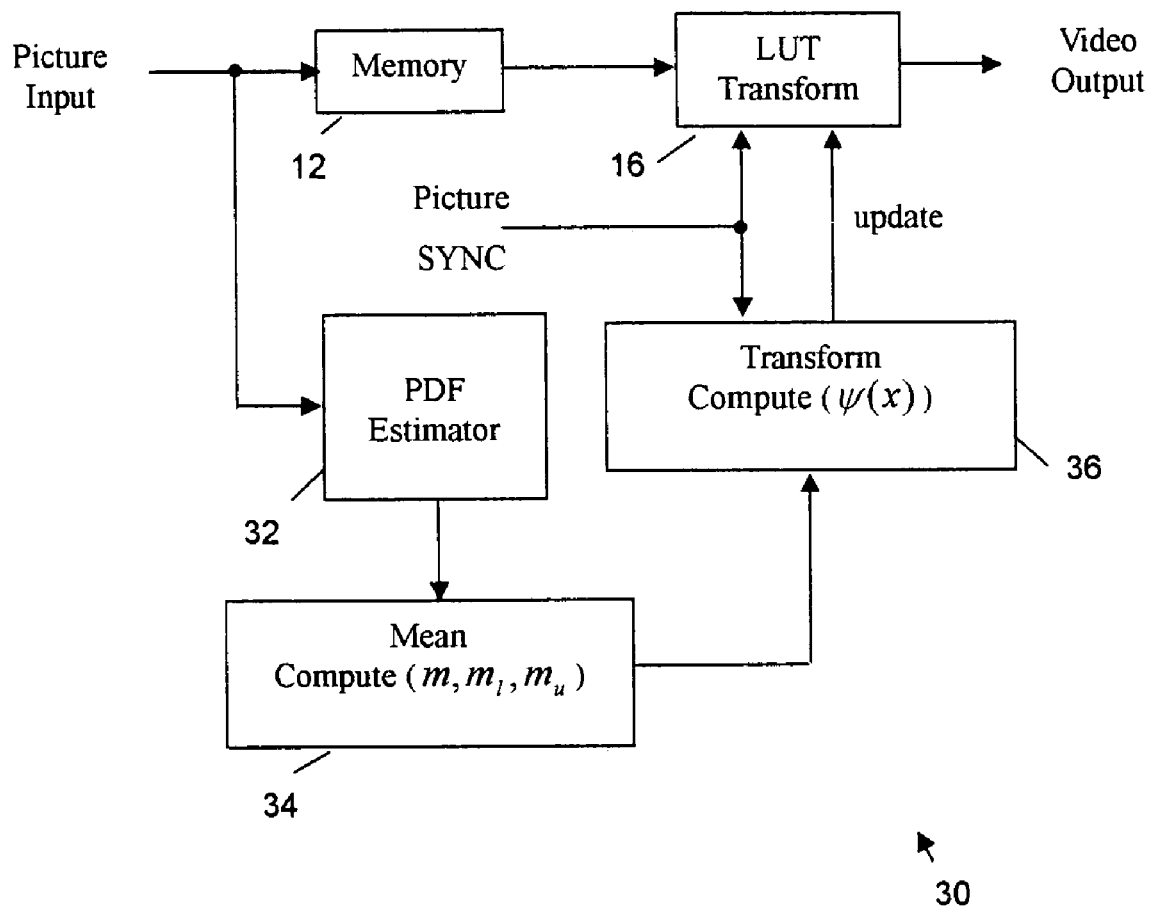
FIG. 7 shows another block diagram of an embodiment of a device for performing the adaptive contrast enhancement method according to the present invention.

FIG. 7 shows a block diagram of another example ACE apparatus 30, implementing an example ACE method, according to the present invention. Such an ACE apparatus is for a contrast enhancement method based on the transform in relation (3), wherein specific functional forms of $f_l(x)$, $f_u(x)$, $g_l(m_l)$ and $g_u(m_u)$ satisfying the respective conditions disclosed in relations (4) through (10) above, are pre-determined. In this example, the ACE apparatus comprises: A memory device 12; A PDF estimator block 32 that computes the PDF, h(x), for an input picture $I_n(\cdot)$ video signal; A mean compute block 34 that computes the mean, m, and $m_l$ and $m_u$ values based on the PDF; A transform compute block 36 that computes $g_l(m_l)$ and $g_u(m_u)$ and $\psi(x)$; and a LUT transform block 38 that constructs said transform LUT and applies the LUT to the incoming video input signal to generate enhanced video output signal, as described. The update can be synchronized with a picture SYNC signal as shown.

Figure 1B:
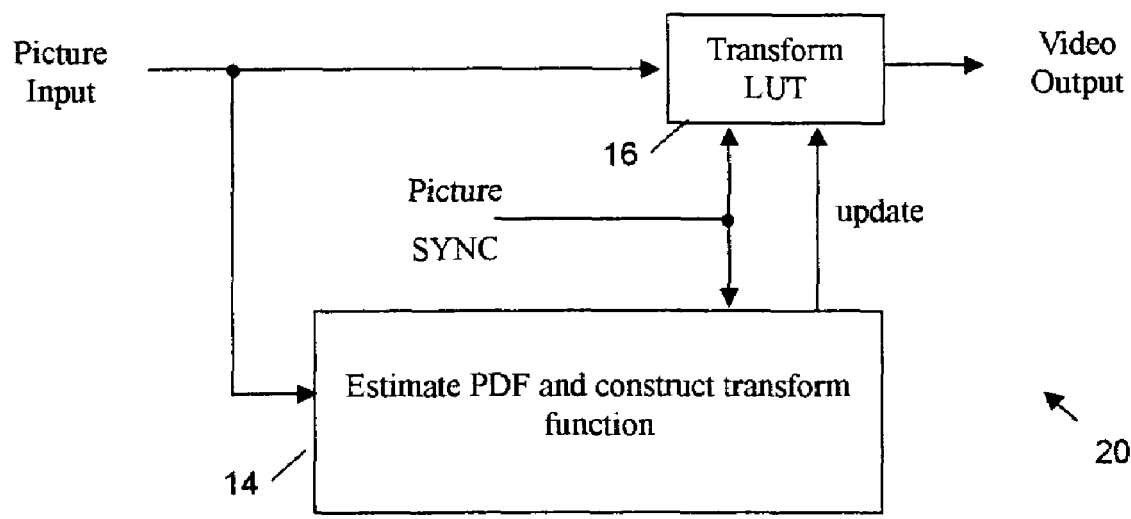
FIG. 1B is a block diagram of another embodiment of a device for performing the adaptive contrast enhancement method according to the present invention.

The incoming picture is stored in the memory 10 while the transform LUT is constructed using parameters obtained from the picture. As noted above, the memory 12 is provided to delay the input video for one frame or field period so that the transform LUT can be applied to the picture that was used to construct the transform LUT, as shown in functional block 16. A video sequence typically has a high correlation in the temporal direction, and therefore, in most applications, the LUT transform that is constructed from one picture can be applied to the subsequent picture in the video sequence. As shown in FIG. 1B above, the incoming picture is not stored in a memory while the transform LUT is constructed using the parameters that are obtained from the incoming picture. The transform that had been constructed from the previous picture in the video sequence is applied to this incoming picture. Similarly, the transform that is being constructed from this incoming picture will be applied to the subsequent picture in the video sequence. Applying the transform LUT to the input picture is a pixel by pixel operation that outputs $\psi(x)$ for the input pixel gradation level x. In both embodiments, the LUT transform can be updated in a manner that is synchronized with a picture SYNC signal.

The various components of the arrangements in FIGS. 1A–B and 7 can be implemented in many ways known to those skilled in the art, such as for example, as program instructions for execution by a processor, as logic circuits such as ASIC, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method for adaptive contrast enhancement, comprising the steps of:
    obtaining a time varying video signal including a plurality of temporally ordered digital pictures, each one of the digital pictures represented by a set of samples, each one of the samples having a gradation level in a range from a lower limit C to an upper limit U;
    constructing a contrast enhancement transform including at least a first transform function and a second transform function by performing steps of:
        (a) for a first one of the digital pictures, selecting a first value for the samples with gradation values between the lower limit C and the upper limit U,
        (b) dividing the set of the samples representing the first one of the digital pictures into a first portion having samples with a first distribution value not greater than the first value and a second portion having samples with a second distribution value not less than the first value,
        (c) selecting the first transform function based on a distribution of the samples with the first distribution value in the first portion, and
        (d) selecting the second transform function in dependence on a distribution of the samples with the second distribution value in the second portion; and
    enhancing contrast of a digital picture by applying the contrast enhancement transform to a set of samples representing the digital picture.

2. The method of claim 1, wherein step (a) further includes the steps of:
    calculating a mean value m from the gradation level of all of the samples representing the first one of the digital pictures, and selecting the first value to be the mean value m.

3. The method of claim 1, wherein step (b) further includes the steps of:
    calculating a first mean value $m_l$ from the gradation level of the samples in the first portion and selecting the first distribution value to be the first mean value $m_l$, and calculating a second mean value $m_u$ from the gradation level of the samples in the second portion and selecting the second distribution value to be the second mean value $m_u$.

4. The method of claim 3, wherein:
    the mean value $m_l$ represents the mean brightness of the samples in the first portion, and the mean value $m_u$ represents the mean brightness of the samples in the second portion.

5. The method of claim 3, further comprising the steps of:
    selecting the digital picture, which is enhanced when performing the step of enhancing the contrast, from a set of digital pictures including the first one of the digital pictures and one of the digital pictures that is temporally subsequent with respect to the first one of the digital pictures.

6. The method of claim 3, wherein the digital picture that is enhanced when performing the step of enhancing the contrast is an immediately temporally subsequent picture with respect to the first one of the digital pictures.

7. The method of claim 3, further comprising the steps of:
    using the contrast enhancement transform to construct a look-up table for receiving input gradation levels in a range from the lower limit C to the upper limit U and for providing corresponding output gradation levels having an increased dynamic range in at least two regions as compared to corresponding regions of the input gradation levels; and
    performing the step of enhancing the contrast by applying the look-up table to the set of the samples and thereby inherently applying the contrast enhancement transform to the set of the samples.

8. The method of claim 7, wherein the step of constructing the contrast enhancement transform includes the steps of:
    constructing the first transform function based on a first enhancement function that is a varying function of gradation level, equaling zero at the lower limit C, equaling zero at the first value, and having only one local maxima in a range from the lower limit C to the first value; and
    constructing the second transform function based on a second enhancement function that is a varying function of gradation level, equaling zero at the first value, equaling zero at the upper limit U, and having only one local maxima in a range from the first value to the upper limit U.

9. A method for adaptive contrast enhancement, comprising the steps of:
    obtaining a time varying video signal including a plurality of temporally ordered digital pictures, each one of the digital pictures represented by a set of samples, each one of the samples having a gradation level in a range from a lower limit C to an upper limit U;

constructing a contrast enhancement transform including at least a first transform function and a second transform function by performing steps of:
(a) for a first one of the digital pictures, selecting a first value for the samples with gradation values between the lower limit C and the upper limit U,
(b) dividing the set of the samples representing the first one of the digital pictures into a first portion having samples with a first mean value not greater than the first value and a second portion having samples with a second mean value not less than the first value,
(c) selecting the first transform function based on a distribution of the samples with the first mean value in the first portion, wherein the first transform function is based on a first enhancement function that is a varying function of gradation level, equaling zero at the lower limit C, equaling zero at the first value, and having only one local maxima in a range from the lower limit C to the first value, and
(d) selecting the second transform function in dependence on a distribution of the samples with the second mean value in the second portion, wherein the second transform function is based on a second enhancement function that is a varying function of gradation level, equaling zero at the first value, equaling zero at the upper limit U, and having only one local maxima in a range from the first value to the upper limit U; and enhancing contrast of a digital picture by applying the contrast enhancement transform to a set of samples representing the digital picture.

10. The method of claim 9, wherein the step of constructing the contrast enhancement transform further includes the steps of:

choosing the first enhancement function to be non-negative in a region from the lower limit C to the first value;
selecting a first gain function that monotonically decreases as a function of the first mean value, the first gain function equaling one at the lower limit C and equaling minus one at the first value;
choosing the second enhancement function to be non-negative in a region from the first value to the upper limit U; and
selecting a second gain function that monotonically decreases as a function of the second mean value, the second gain function equaling one at the first value and equaling minus one at the upper limit U;
constructing the first transform function by multiplying the first enhancement function by the first gain function; and
constructing the second transform function by multiplying the second enhancement function by the second gain function.

11. The method of claim 10, further comprising the steps of:

calculating a mean value m from the gradation level of all of the samples representing the first one of the digital pictures, and selecting the first value to be the mean value m;
calculating a mean value $m_l$ from the gradation level of the samples in the first portion and selecting the first mean value to be the mean value $m_l$; and calculating a mean value $m_u$ from the gradation level of the samples in the second portion and selecting the second mean value to be the mean value $m_u$.

12. The method of claim 11, wherein:
the mean value $m_l$ represents the mean brightness of the samples in the first portion, and the mean value $m_u$ represents the mean brightness of the samples in the second portion.

13. The method of claim 9, wherein the step of constructing the contrast enhancement transform further includes the steps of:

choosing the first enhancement function to be non-positive in a region from the lower limit C to the first value;
selecting a first gain function that monotonically increases as a function of the first mean value, the first gain function equaling minus one at the lower limit C and equaling one at the first value;
choosing the second enhancement function to be non-positive in a region from the first value to the upper limit U; and
selecting a second gain function that monotonically increases as a function of the second mean value, the second gain function equaling minus one at the first value and equaling one at the upper limit U;
constructing the first transform function by multiplying the first enhancement function by the first gain function; and
constructing the second transform function by multiplying the second enhancement function by the second gain function.

14. The method of claim 13, further comprising the steps of:

calculating a mean value m from the gradation level of all of the samples representing the first one of the digital pictures, and selecting the first value to be the mean value m;
calculating a mean value $m_l$ from the gradation level of the samples in the first portion and selecting the first mean value to be the mean value $m_l$; and calculating a mean value $m_u$ from the gradation level of the samples in the second portion and selecting the second mean value to be the mean value $m_u$.

15. The method of claim 14, wherein:
the mean value $m_l$ represents the mean brightness of the samples in the first portion, and the mean value $m_u$ represents the mean brightness of the samples in the second portion.

16. The method of claim 9, wherein the step of constructing the contrast enhancement transform includes the steps of:

when the first enhancement function is chosen to be non-negative in a region from the lower limit C to the first value, then selecting a first gain function that monotonically decreases as a function of the first mean value;
when the second enhancement function is chosen to be non-negative in a region from the first value to the upper limit U, then selecting a second gain function that monotonically decreases as a function of the second mean value;
when the first enhancement function is chosen to be non-positive in the region from the lower limit C to the first value, then selecting a first gain function that monotonically increases as a function of the first mean value;
when the second enhancement function is chosen to be non-positive in the region from the first value to the upper limit U, then selecting a second gain function that monotonically increases as a function of the second mean value;

constructing the first transform function by multiplying the first enhancement function by the first gain function; and constructing the second transform function by multiplying the second enhancement function by the second gain function.

17. The method of claim 16, further comprising the steps of:

calculating a mean value m from the gradation level of all of the samples representing the first one of the digital pictures, and selecting the first value to be the mean value m;

calculating a mean value $m_l$ from the gradation level of the samples in the first portion and selecting the first mean value to be the mean value $m_l$; and calculating a mean value $m_u$ from the gradation level of the samples in the second portion and selecting the second mean value to be the mean value $m_u$.

18. The method of claim 17, wherein:

the mean value $m_l$ represents the mean brightness of the samples in the first portion, and the mean value $m_u$ represents the mean brightness of the samples in the second portion.

19. The method of claim 17, further comprising the steps of:

selecting the first enhancement function to be $K_l(x-C)(m-x)$, where $K_l$ is a constant and x is an input sample; and selecting the second enhancement function to be $K_u(m-x)(x-U)$, where $K_u$ is a constant.

20. The method of claim 19, further comprising the steps of:

choosing $K_l$ to be not greater than $1/(m-C)$; and choosing $K_u$ to be not greater than $1/(U-m)$.

21. The method of claim 19, further including the steps of:

selecting the first gain function to be:

$2(m_l-C)/(m-C)-1$; and selecting the second gain function to be:

$2(m_u-m)/(u-m)-1$.

22. The method of claim 21, further including the steps of:

choosing $K_l$ to be $1/(m-C)$; and choosing $K_u$ to be $1/(U-m)$.

23. The method of claim 16, further comprising the steps of:

constructing the first transform function by multiplying the first enhancement function by the first gain function and by a first pre-determined gain factor to adjust the overall degree of enhancement; and constructing the second transform function by multiplying the second enhancement function by the second gain function and by a second pre-determined gain factor to adjust the overall degree of enhancement.

24. An adaptive contrast enhancement device for enhancing a time varying video signal including a plurality of temporally ordered digital pictures, each one of the digital pictures represented by a set of samples, each one of the samples having a gradation level in a range from a lower limit C to an upper limit U, comprising:

a distribution estimator that determines the number of samples in a picture, having gradation values a mean estimator that:

for a first one of the digital pictures, determines a first value for the samples with gradation values between the lower limit C and the upper limit U;

for a first portion of the samples, determines a first mean value not greater than the first value, and for a second portion of the samples, determines a second mean value not less than the first value, a contrast enhancer that enhances contrast of the digital picture by applying a contrast enhancement transform to a set of samples representing the digital picture, the contrast enhancer including a first transform function and a second transform function, wherein:

the first transform function is based on a distribution of the samples with the first mean value in the first portion, and the second transform function in dependence on a distribution of the samples with the second mean value in the second portion.

25. The adaptive contrast enhancement device of claim 24, wherein:

the first transform function is based on a first enhancement function that is a varying function of gradation level, equaling zero at the lower limit C, equaling zero at the first value, and having only one local maxima in a range from the lower limit C to the first value, and the second transform function is based on a second enhancement function that is a varying function of gradation level, equaling zero at the first value, equaling zero at the upper limit U, and having only one local maxima in a range from the first value to the upper limit U.

26. The adaptive contrast enhancement device of claim 25, wherein the mean estimator:

calculates a mean value m from the gradation level of all of the samples representing the first one of the digital pictures, and selects the first value to be the mean value m;

calculates a mean value $m_l$ from the gradation level of the samples in the first portion and selects the first mean value to be the mean value $m_l$; and calculates a mean value $m_u$ from the gradation level of the samples in the second portion and selects the second mean value to be the mean value $m_u$.

27. The adaptive contrast enhancement device of claim 26, wherein:

the mean value $m_l$ represents the mean brightness of the samples in the first portion, and the mean value $m_u$ represents the mean brightness of the samples in the second portion.

28. The adaptive contrast enhancement device of claim 25, wherein:

the contrast enhancer further includes a first gain function and a second gain function, such that:

when the first enhancement function is non-negative in a region from the lower limit C to the first value, the first gain function monotonically decreases as a function of the first mean value;

when the second enhancement function is non-negative in a region from the first value to the upper limit U, then the second gain function monotonically decreases as a function of the second mean value;

when the first enhancement function is non-positive in the region from the lower limit C to the first value, then the first gain function monotonically increases as a function of the first mean value;

when the second enhancement function is non-positive in the region from the first value to the upper limit U, then the second gain function monotonically increases as a function of the second mean value;

the first transform function is based on a mathematical product of the first enhancement function and the first gain function; and the first transform function is based on a mathematical product of the second enhancement function and the second gain function.

29. The adaptive contrast enhancement device of claim 28, the mean estimator:

calculates a mean value m from the gradation level of all of the samples representing the first one of the digital pictures, and selects the first value to be the mean value m;

calculates a mean value $m_l$ from the gradation level of the samples in the first portion and selects the first mean value to be the mean value $m_l$; and calculates a mean value $m_u$ from the gradation level of the samples in the second portion and selects the second mean value to be the mean value $m_u$.

30. The adaptive contrast enhancement device of claim 29, wherein:

the first enhancement function is selected to be $K_l(x-C)(m-x)$, where $K_l$ is a constant and x is an input sample; and the second enhancement function is selected to be $K_u(m-x)(x-U)$, where $K_u$ is a constant.

31. The adaptive contrast enhancement device of claim 30, wherein:

$K_l$ is selected to be not greater than $1/(m-C)$; and $K_u$ is selected to be not greater than $1/(U-m)$.

32. The adaptive contrast enhancement device of claim 30, wherein:

the first gain function is selected to be:

$2(m_l-C)/(m-C)-1$; and the second gain function is selected to be:

$2(m_u-m)/(u-m)-1$.

33. The adaptive contrast enhancement device claim 32, wherein:

$K_l$ is selected to be $1/(m-C)$; and $K_u$ is selected to be $1/(U-m)$.

34. The adaptive contrast enhancement device of claim 28, wherein:

the first transform function is based on a mathematical product of: (i) the first enhancement function, (ii) the first gain function and (iii) a first pre-determined gain factor to adjust the overall degree of enhancement; and the first transform function is based on a mathematical product of: (i) the second enhancement function, (ii) the second gain function and (iii) a second pre-determined gain factor to adjust the overall degree of enhancement.

* * * * *